US008855448B2

(12) United States Patent
Doerr

(10) Patent No.: US 8,855,448 B2
(45) Date of Patent: Oct. 7, 2014

(54) ADVANCED MODULATION FORMAT USING TWO-STATE MODULATORS

(75) Inventor: Christopher R. Doerr, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 578 days.

(21) Appl. No.: 13/041,976

(22) Filed: Mar. 7, 2011

(65) Prior Publication Data

US 2011/0158577 A1 Jun. 30, 2011

Related U.S. Application Data

(60) Continuation-in-part of application No. 12/586,639, filed on Sep. 25, 2009, now Pat. No. 7,929,813, which is a division of application No. 12/006,194, filed on Dec. 31, 2007, now Pat. No. 7,636,501.

(51) Int. Cl.

| G02F 1/035 | (2006.01) |
| H04B 10/50 | (2013.01) |
| H04B 10/556 | (2013.01) |
| G02F 1/225 | (2006.01) |
| H04B 10/54 | (2013.01) |
| G02F 1/21 | (2006.01) |
| G02F 1/015 | (2006.01) |

(52) U.S. Cl.
CPC .......... *G02F 1/2257* (2013.01); *H04B 10/5053* (2013.01); *H04B 10/5561* (2013.01); *G02F 2202/108* (2013.01); *G02F 2001/212* (2013.01); *G02F 2001/0155* (2013.01); *H04B 10/541* (2013.01)
USPC .................................................. 385/3; 385/2

(58) Field of Classification Search
None
See application file for complete search history.

(56) References Cited

U.S. PATENT DOCUMENTS

| 7,636,501 | B2 | 12/2009 | Doerr et al. | |
| 7,929,813 | B2 | 4/2011 | Doerr et al. | |
| 2004/0170351 | A1* | 9/2004 | Fishman et al. | 385/3 |
| 2009/0169148 | A1 | 7/2009 | Doerr et al. | |

OTHER PUBLICATIONS

R. Giffin, et al., "Integrated DQPSK Transmitter for Dispersion-Tolerant and Dispersion-Managed DWDM Transmission", Optical Fiber Communication Conference, Atlanta, GA, 2003, Paper FP6, 2 pages.
K. Higuma, et al., "A Bias Condition Monitor Technique for the Nested Mach-Zehnder Modulator", IEICE Electronics Express, vol. 3, 2006, pp. 238-242.
L. Zhang, et al., "Low-Voltage High Speed Traveling Way InGasP-InP Phase Modulator", IEEE Photon. Technol. Lett., vol. 16, Aug. 2004, pp. 1831-1833.

(Continued)

*Primary Examiner* — Jerry Rahll
(74) *Attorney, Agent, or Firm* — Hitt Gaines, PC

(57) ABSTRACT

An optical modulator device comprising an interferometer. The interferometer includes an input optical coupler, an output optical coupler, and two or more controllable optical waveguides located on a substrate. Each controllable optical waveguide connects the input optical coupler to the output optical coupler and has two-state modulator along a segment thereof. The two or more controllable optical waveguides are connected to transmit an output to the output optical coupler, substantially different light amplitudes and/or phases when the two-state modulators of the two controllable optical waveguides are in different states, as driven by data streams having different information content. The two or more controllable optical waveguides are configured to modulate the light amplitudes and/or phases in a substantially same manner when the two-state modulators are in identical states.

13 Claims, 6 Drawing Sheets

(56) References Cited

OTHER PUBLICATIONS

H.N. Klein, et al., "1.55 μm Mach-Zehnder Modulators on InP for Optical 40/80 Gbit/s Transmission networks," Integrated Photonics Research M, Princeton NJ, 2006, paper TuA2.4, pp. 171-173.

R.G. Walker, "High-Speed III-V Semiconductor Intensity Modulators", IEEE J. Quantum Electron., vol. 27, No. 3, Mar. 1991, pp. 654-667.

H. Kawanishi, et al., "EAM-Integrated DFB Laser Modules with More than 40 THz Bandwidth", IEEE Photon. Technol. Lett., vol. 13, Sep. 2001, pp. 954-956.

I. Kang, "Interferometric Operation of an Electroabsorption Modulator for PSK Modulation and OOK Modulation with Performance Enhancements", European Conf. Opt. Comm., Cannes, France, 2006, paper We3.P.59, 2 pages.

Takahide Sakamoto, et al., "50-Gb/s 16 QAM by a Quad-Parallel Mach-Zehnder Modulator," European Conference on Optical Communication, paper PD 2.8, Berlin, Sep. 2007, 2 pages.

C.R. Doerr, et al., "Compact EAM-Based InP DQPSK Modulator and Demonstration at 80 Gb/s," in National Fiber Optic Engineers Conference, Anaheim, CA, Mar. 25, 2007, OSA Technical Digest Series (CD) (Optical Society of America, 2007), paper PDP33, 3 pages.

C.R. Doerr, et al., "Compact High-Speed, InP DQPSK Modulator," IEEE Photonics Technology Letters, vol. 19, No. 15 (Aug. 1, 2007) pp. 1184-1186.

I Kang, "Phase-Shift-Keying and On-Off Keying with Improved Performances Using Electroabsorption Modulators with Interferometric Effects," Optics Express, vol. 15, No. 4, (Feb. 19, 2007), pp. 1467-1473.

* cited by examiner

ADVANCED MODULATION FORMAT USING TWO-STATE MODULATORS

CROSS-REFERENCE TO RELATED APPLICATIONS

The present application is a continuation-in-part application of U.S. patent application Ser. No. 12/586,639 (639' application) filed on Sep. 25, 2009 now U.S. Pat. No. 7,929,813 by Doerr, which in turn, is a divisional application of patent application Ser. No. 12/006,194 filed on Dec. 31, 2007 by Doerr, now issued as U.S. Pat. No. 7,636,501, all which are commonly assigned with the present application and are incorporated herein by reference in their entirety.

TECHNICAL FIELD OF THE INVENTION

The present invention is directed, in general, to optical transmission devices and more particularly, to optical modulators and optical modulation methods, and methods for manufacturing the same.

BACKGROUND OF THE INVENTION

This section introduces aspects that may help facilitate a better understanding of the disclosure. Accordingly, these statements are to be read in this light and are not to be understood as admissions about what is prior art or what is not prior art.

There is great interest in optical communication systems that transmit data at high rates. While high transmission rates can be achieved by multiplexing a data stream onto different optical channels in parallel, this simple technique tends to provide a low spectral efficiency. The spectral efficiency may be increased by relying on larger symbol constellations to modulate the data stream onto the optical carrier, e.g., a quadrature phase shift keyed (QPSK) constellation. Some larger symbol constellations can be used by optical modulators in which optical phase shifter(s) are constructed to provide a range of phase shifts. Nevertheless, some such optical phase shifters are complicated to implement due to nonlinearities and/or weak electro-optical responses and/or difficulty in generating multi-level electrical signals at high speed.

SUMMARY OF THE INVENTION

One embodiment of the present disclosure includes an optical modulator device that comprises an interferometer. The interferometer includes an input optical coupler, an output optical coupler, and two or more controllable optical waveguides located on a substrate. Each controllable optical waveguide connects the input optical coupler to the output optical coupler and has a two-state modulator along a segment thereof. The two or more controllable optical waveguides are connected to transmit an output to the output optical coupler, substantially different light amplitudes and/or phases when the two-state modulators of the two controllable optical waveguides are in different states, as driven by data streams having different information content. The two or more controllable optical waveguides are configured to modulate the light amplitudes and/or phases in a substantially same manner when the two-state modulators are in identical states.

Another embodiment is a method of modulating digital data onto an optical carrier. Modulating the optical carrier includes intensity splitting the optical carrier in an input optical coupler of the above-described interferometer. Modulating the optical carrier also includes optically modulating, in parallel, a separate data stream onto the individual mutually coherent optical carriers produced by the splitting.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

This section introduces aspects that may help facilitate a better understanding of the disclosure. Accordingly, the statements of this section are to be read in this light and are not to be understood as admissions about what is prior art or what is not prior art.

For the purposes of the present disclosure, the term, "or," as used herein, refers to a non-exclusive or, unless otherwise indicated.

Embodiments of the disclosure benefit from the recognition that certain embodiments of electro-absorption modulators, such as disclosed in the 639' application, which have the benefit of short length and low voltage requirements. However, it can be difficult to obtain a high extinction ratio at very high modulation rates. Additionally, at very high modulation rates, the insertion loss can be high because of the absorption from the controllable waveguide modulators.

Figure 1:
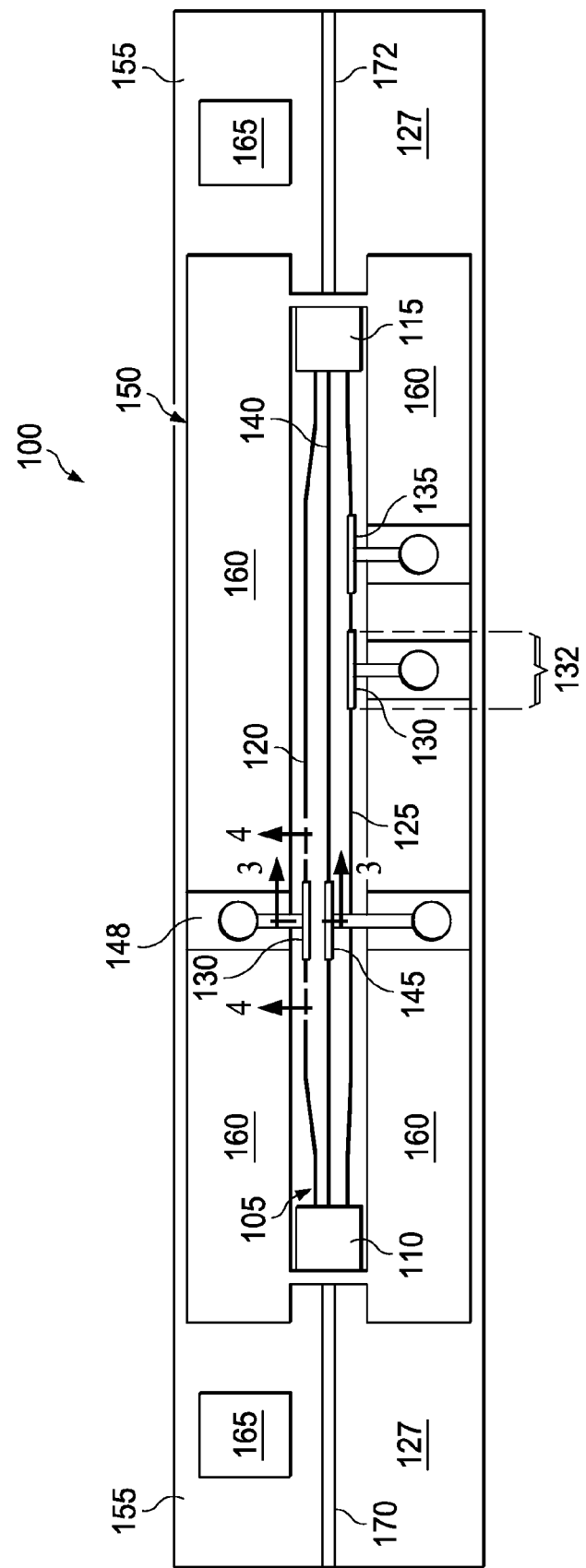
FIG. 1 shows a plan view of an example embodiment of an optical modulator device of the disclosure.

One embodiment of the disclosure is an optical modulation device. In some embodiments, the optical modulation device can be an electronic-photonic device such as a photonic integrated circuit (PIC). FIG. 1 shows a plan view of an example embodiment of an optical modulator device 100 of the disclosure. The optical modulation device 100 comprises an interferometer 105 that includes an input optical coupler 110, an output optical coupler 115, and two or more controllable optical waveguides 120, 125 located on a substrate 127, each controllable optical waveguide 120, 125 connecting the input optical coupler 110 to the output optical coupler 115 and having a two-state modulator 130 along a segment 132 thereof. The two or more controllable optical waveguides 120, 125 are configured to modulate the light amplitudes and/or phases in a substantially same manner when the two-state modulators 130 are in identical states (i.e., as driven by a same data stream). That is, modulator 130 in waveguide 120 has the same absorption and phase change with voltage as modulator 130 in waveguide 125.

Certain embodiments of the input and output couplers 110, 115 can be star-couplers. The controllable optical waveguides 120, 125 connect the input optical coupler 110 to the output optical coupler 115 via parallel optical paths.

As used herein, a two-state modulator refers to an optical modulator, that when driven by a binary electrical signal (e.g., two different voltages), produces a constellation of two different signal points. Each signal point corresponds to an output optical signal with a particular phase and amplitude. The constellation is achieved via optical phase modulation and/or optical amplitude modulation of the light received in the corresponding optical modulator.

As used herein, the phrase, "modulate the amplitudes or (phases) in a substantially same manner if the two-state modulators were in an identical state," means that, if the same electrical voltage is applied to any one of the two-state modulators 130, then said modulator would modulate the amplitude and phase of the optical signal input thereto to substantially the same extent as any other of the two-state modulator. For example, in identical states, the output modulated light signal would typically have about the same amplitude and phase, e.g., to within about ±15 percent.

One advantage of an array of two-state modulators 130, that modulate received light in substantially the same manner, is that imperfections in the modulator will affect all modulators identically, and thus a single optical equalizing filter placed after the modulator device can mitigate the imperfection for all modulators simultaneously.

Embodiments of the two-state modulator 130 can include an electrically controllable single waveguide, such as shown in FIG. 1, but in other embodiments, the two-state modulator 130 is a Mach-Zehnder interferometer (MZI) modulator. For example, the MZI modulator may be configured as a push-pull MZI, although other types of MZIs could be used.

In other embodiments, the two-state modulator 130 is a quantum-confined Stark-effect (QCSE) modulator. Some QCSE modulators can provide advantages of reduced power consumption, less complexity of manufacture, or faster operating speeds.

In some embodiments, a QCSE modulator can facilitate phase modulation at light whose wavelength corresponds to an energy closer to the band edge of semiconductor a semiconductor layer in the waveguides 120, 125. For instance, the multiple quantum wells of some QCSE modulators have a sharper band edge than bulk materials used in some semiconductor phase modulators. Operating nearer the band edge, however, may increase insertion losses. It may be desirable for the device's 100 operating wavelength to be far enough away from the band edge that insertion losses are low or minimizal and phase modulation produces phase changes by $\pi$ or less.

As further illustrated in FIG. 1, in some embodiments of the device 100, all but one, and in some cases all, of the controllable optical waveguides 120, 125 can include a static-phase adjustor 135. The static-phase adjustor changes the overall phase produced on light propagating through the optical waveguide with the static-phase adjustor relative to the phase(s) produced on light propagating through the other parallel waveguide(s).

In some cases, the static-phase adjustor 135 is simply a short additional length of waveguide. In other cases, the static-phase adjustor can be an electrical device that is configured to apply a constant or slowly adjusting phase adjustment to the corresponding controllable waveguide 120, 125 during the device's 100 operation. For example, the static-phase adjustor 135 can be a thermo-optic phase shifter to which a constant voltage is applied during the optical modulator's operation.

The static-phase adjustor 135 can help move the constellation points of optically phase and or amplitude modulated light to a preselected two-dimensional lattice. For instance, in the absence of the static-phase adjustor 135, the optical phase and amplitude modulation of light by the optical modulator 105 may, in some cases, produce a one-dimensional constellation of signal points rather than a two-dimensional constellation thereof.

In one embodiment of the interferometer 105 that produces 4-quadrature phase shift keying, e.g., via QPSK modulation with two controllable optical waveguides 120, 125, such as depicted in FIG. 1. One of the two controllable optical waveguides 125 includes a static-phase adjustor 135 configured to adjust the relative phase of light passing through the one waveguide 125 by + or $-\pi/2$ with respect to that of waveguide 120.

In one embodiment of the interferometer 105 that produces a 16-quadrature QAM constellation, there are four controllable optical waveguides 120, 125. The first, second, and third ones of the controllable optical waveguides 120, 125 include a static-phase adjustor to introduce phases or about $\pi/2$ $-\pi/2$ and $\pi$, respectively, of light propagating therethrough with respect to the phase of light propagating through the fourth of the controllable optical waveguides 120, 125.

In an embodiment of the interferometer 105 configured to produce 64-quadrature QAM, there may be six controllable optical waveguides of the interferometer, wherein 5 of the controllable optical waveguides include a static-phase adjustor. For instance, two of the five controllable waveguides can be adjust relative phases by $\pi/2$, a different two of the five controllable waveguides can adjust relative phases by $\pi$, and the fifth controllable waveguide can adjust the relative phases by $-\pi/2$, wherein all phases are relative to that of light propagating through the sixth controllable optical waveguide.

Alternatively, in some embodiments of the device 100, one or both of the input optical coupler 110 or output optical coupler 115 can be configured to provide a relative static phase adjustment to all but one, or in some of the controllable optical waveguides 120, 125. For instance, the input optical coupler 110 and/or the output optical coupler 115, could be designed to include static-phase adjustment (e.g., by adjusting the light path-length within the one or both couplers 110, 115 thereby obviating the need to incorporate in-line static-phase adjustors 135 in the controllable optical waveguides 120, 125.

As also illustrated in FIG. 1, in some embodiments of the device 100, the interferometer 105 further includes a static-controlled waveguide 140. In the static-controlled waveguide 140, there is no data-stream being temporally modulated onto an optical carrier. Including a static-controlled waveguide 140 can beneficially reduce the presence of a residual optical carrier signal that would otherwise generate a non-zero average complex amplitude in the constellation produced by the optical interferometer 105.

In some cases, it is desirable for the interferometer 105 to further include one or more adjustable optical phase and amplitude attenuators 145 coupled to the static-controlled waveguide 140. Although the phase and amplitude attenuators may be adjustable, they are configured to provide a constant phase or amplitude adjustment during the periods that the controllable modulators are in operation. For instance, the adjustable optical phase and amplitude attenuator 145 can be used to adjust one or both of the phase or amplitude of light passing through the static-controlled waveguide 140 so as to optimize the removal of a DC optical carrier from the signal stream output by the optical interferometer 105. Example embodiments of the adjustable optical phase and amplitude attenuators 145 include thermo-optic phase shifters, current-injection phase shifters or electro-absorption attenuators.

As illustrated in FIG. 1, in some cases, the optional static-controlled waveguide 140 connects the input optical coupler 110 to the output optical coupler 115 in parallel with the controllable optical waveguides 120, 125.

Figure 2:
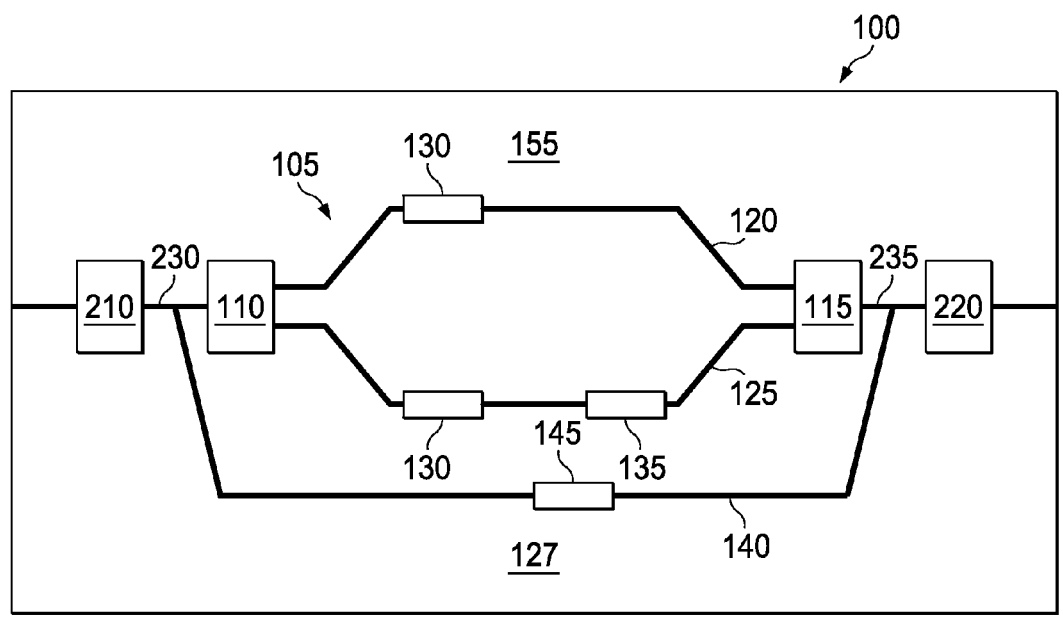
FIG. 2 shows a plan view of another example embodiment of an optical modulator device of the disclosure.

In other embodiments, the non-controlled waveguide 140 by-passes one or both of the input or output optical couplers 110, 115 as illustrated, e.g., in FIG. 2. For instance, the static-controlled waveguide 140 can be connected to the input coupler 110 and to the output coupler 115, by a second input optical coupler 210 and a second output coupler 220, respectively, as well as addition waveguides 230, 235.

Figure 3:
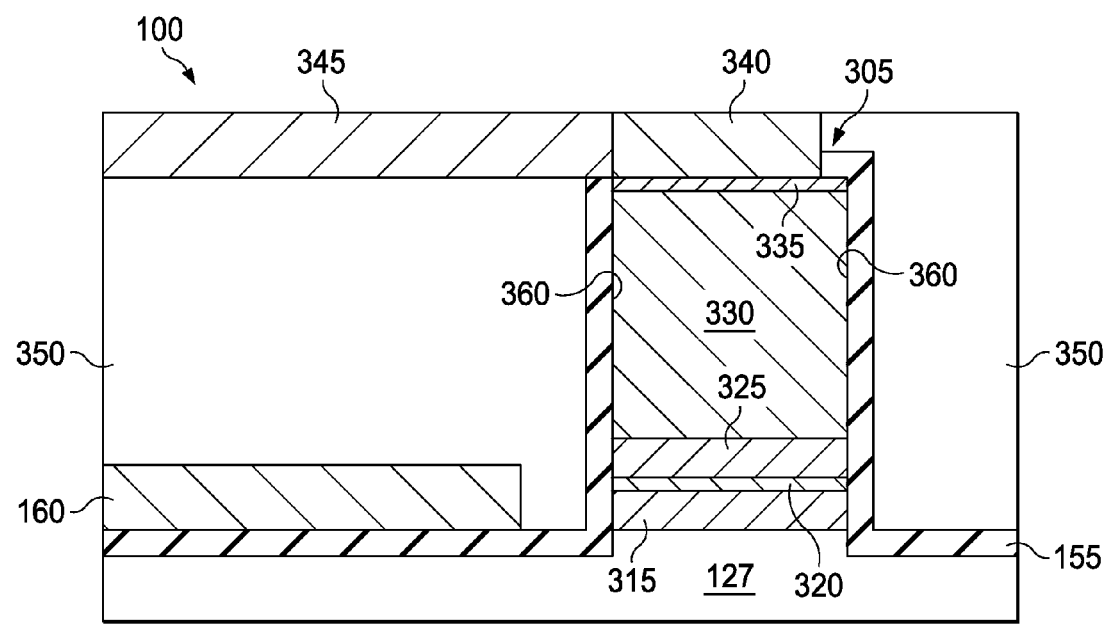
FIG. 3 shows a detailed cross-sectional view of the device shown in FIG. 1, corresponding to view line 3-3 in FIG. 1.
Figure 4:
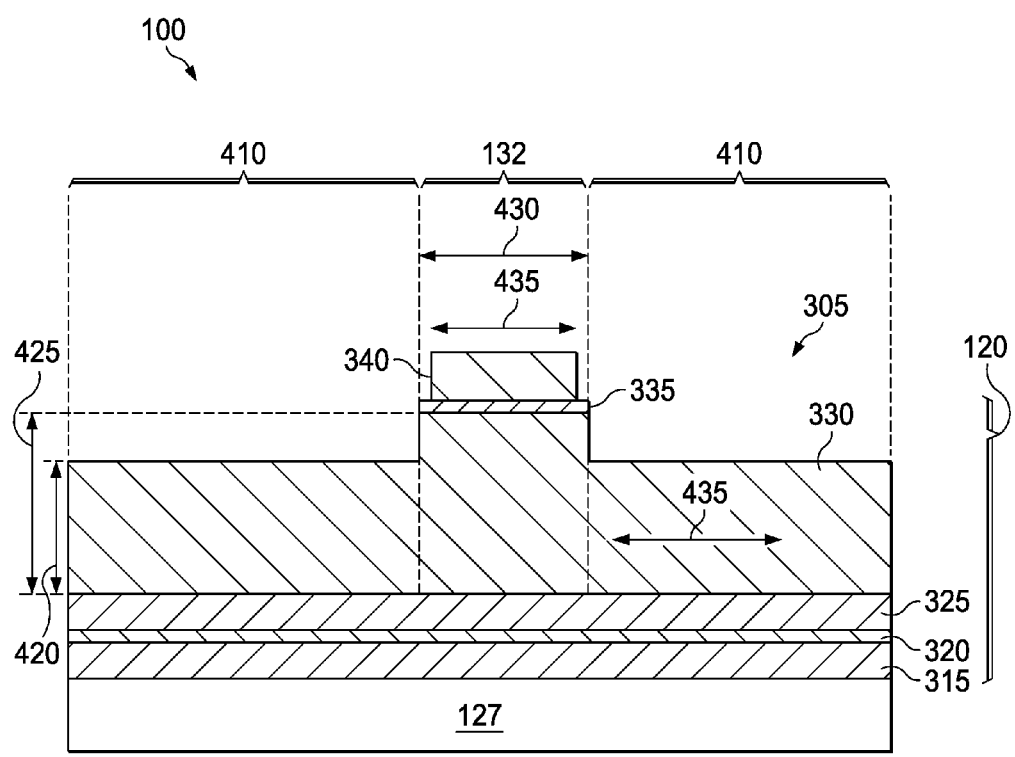
FIG. 4 shows a detailed cross-sectional view of the device shown in FIG. 1, corresponding to view line 4-4 in FIG. 1.
Figure 5:
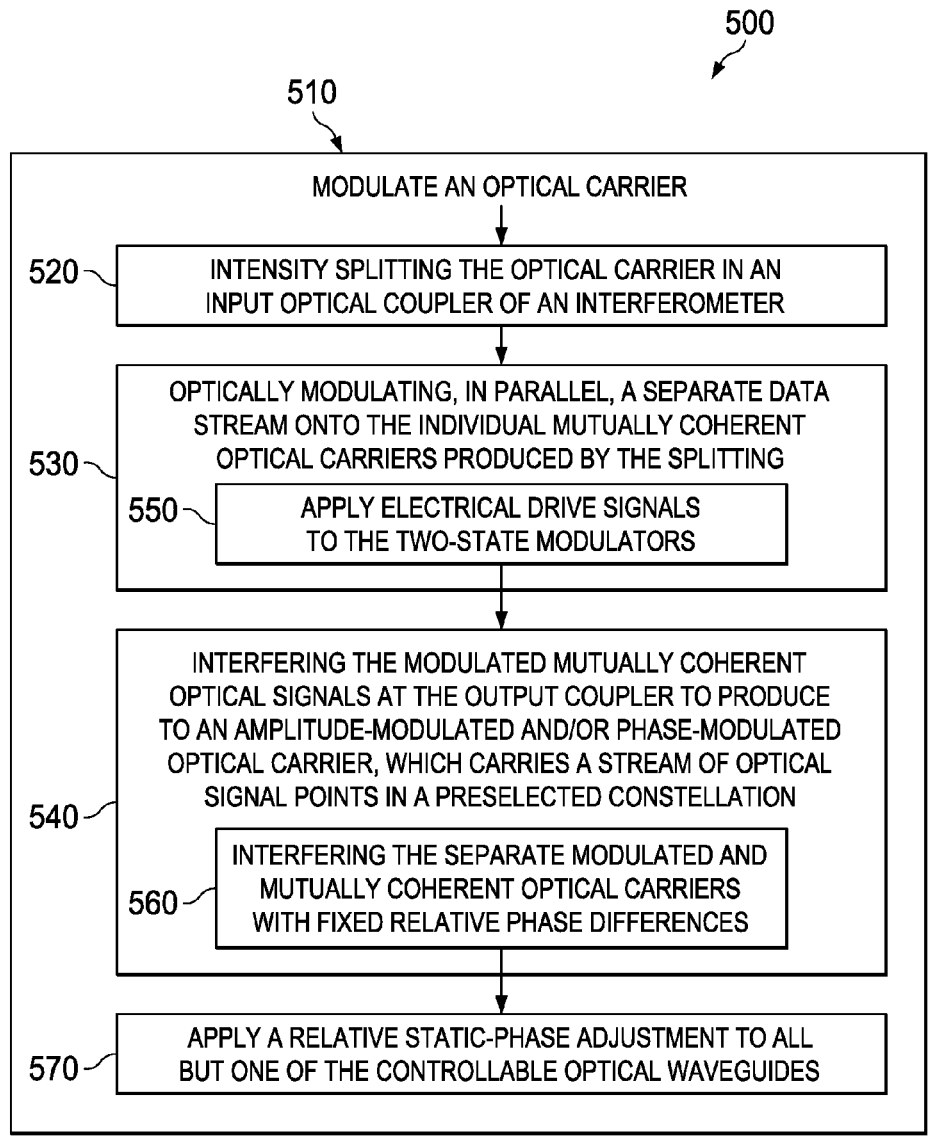
FIG. 5 shows a flow diagram of an example embodiment of a method of transforming information in accordance with the disclosure, for example using any of the optical modulator devices discussed in the context of FIG. 1-4 or 6A-7B.

FIGS. 3 and 4 present detailed cross-sectional views of the device 100 shown in FIG. 1, corresponding to view line 3-3, and view line 4-4, in FIG. 1, respectively.

In an example embodiment, each of the controllable waveguides 120, 125 are formed of a stack 305 of III-V semiconductor material layers located on the substrate 127 that includes a different III-V semiconductor material. In some embodiments, for example, the two or more waveguides 120, 125 are composed of a quaternary III-V alloy and the substrate 127 is composed of an n-doped binary III-V alloy (e.g., an n-doped InP substrate).

In some embodiments, such as when the two-state modulator 130 is configured as a QCSE modulator, the stack 305 can include an active layer 315. In some cases the active layer 315 can include one or more quantum well layers each sandwiched between barrier layers. For example, some embodiments of the active layer 315 can comprise multiple quantum well layers interleaved with barrier layers. For example several (e.g., eight quantum well layers in total) multiple quantum well layer composed of a III-V semiconductor alloy (e.g., a quaternary III-V alloy, such as InGaAsP alloy) can be interleaved with several barrier layers (e.g., nine barrier layers in total) composed of another III-V semiconductor alloy (e.g., also an InGaAsP alloy) whose elemental ratios are adjusted to give a different band gap than the quantum well layers.

As illustrated in FIG. 3, in some embodiments, of the stack 305, a band-gap III-V transition layer 320 is located on the active layer 315 and an intrinsic III-V material layer 325 located on the band-gap III-V transition layer. The band-gap transition layer 320 is composed of a III-V semiconductor material, e.g., a quaternary III-V alloy such as InGaAsP alloy whose composition is adjusted to provide a band gap intermediate (e.g., about mid-way, in some cases) between the band gap of the barrier layers of the active layer 315 and the band gap of the intrinsic III-V material layer 325. In some cases, the composition of the band-gap III-V transition layer 320 is adjusted in two or more stages such that, in a direction towards the intrinsic III-V material layer 325, the transition layer's 320 band gap changes from a value substantially equal to (e.g., within 10%) the band gap of the barrier layer of the quantum well, to a value substantially equal (e.g., within 10%) to the band gap of the intrinsic III-V material layer 325.

In cases when the active layer 315 is absorbing light, it can generate electron-hole pairs, which in turn, can cause the build-up of an electrical field in the active layer 315 and thereby cause light-absorption saturation. Mitigating such saturation effects is important because otherwise in certain embodiments of the interferometer 105, some two-state modulators 120, 125 receive less optical power than other two-state modulators and thus exhibit different performance, thereby degrading the separation between the constellation of optical points in the presence of saturation. The band-gap III-V transition layer 320 facilitates the removal of the electron-volt pairs in the active layer 315 by reducing the potential energy barrier for holes to enter the intrinsic III-V material layer 325. Reducing hole trapping in the active layer 315, in turn, allows greater amounts of optical power (e.g., about 3 mW in some cases) to be absorbed to the modulators than hither-to possible. In some embodiments, the thickness of the active layer 315 can be about 350 nm.

As also illustrated in FIGS. 3 and 4, in some embodiments, the stack 305 further includes a p-doped III-V material layer 330 (e.g., p-doped InP) on the intrinsic III-V material layer 325 and a p+-doped III-V electrical contact layer 335 (e.g., P+-doped InGaAs) on the p-doped III-V material layer 330. As further illustrated, a control electrode 340 (e.g., a gold layer) can be located on the stack 305 (e.g., directly on the p+-doped III-V material layer 335). As further illustrated in FIG. 3, in some embodiments, the control electrode 340 can include a bond pad 345 located on an insulator layer 148 surrounding the stack 305. The control electrode 340 can be configured as a control electrode of the modulator.

Passive segments 410 and the controlled-modulated segment 132 of the controllable waveguides 120, 125 can be composed of the III-V semiconductor material layers of the stack 305. In some embodiments, increased electrical isolation between p-doped III-V material layer 330 in the passive segments 410 and modulated segment 132 can be facilitated by reducing the height 420 of the p-doped III-V material layer 330 in the passive segments 410 relative to the height 425 of the p-doped III-V material 330 in the modulated segment 132. For instance, conventional patterning and etching processes can be used to selectively reduce the height 420 in passive segments 410. For instance, as shown in FIG. 4, in some cases, the height 420 of a p-doped III-V material layer 330 in passive segments 410 are in a range of about 15 to 25 percent and in some preferred embodiments, about 20 percent less, than a height 425 of the p-doped III-V material layer 330 in the modulated segment 132. For example, in some embodiments, the p-doped III-V material layer 325 is composed of p-doped InP and has a height 420 of about 900 to 1000 nm, and in some preferred embodiments about 950 nm, in passive segment 410, and, a height 425 in a range of about 1150 to 1250 nm, and in some preferred embodiments about 1200 nm, in modulated segment 132.

As further illustrated in FIG. 4, in some embodiments the modulated segment of the stack 305 has a length 430 (e.g., along a long axis 435 of the waveguide 120) that is in a range from about 50 to 250 microns, and more preferably in some cases in a range from about 110 to 120 microns. The length 430 represents a careful balance of two factors: increasing modulation speed versus decreasing extinction ratio (i.e., the ratio of the attenuations of the modulator in its two states of differing absorption). A shorter length 430 can lower the extinction ratio while at the same time permitting a higher modulation speed, by minimizing the capacitances associated with the stack 305. As further illustrated, each of the two-state modulators 130 includes an upper control electrode 340 layer located over a segment of one of the controllable waveguide. As further illustrated in FIG. 4, in some embodiments, the control electrode 340 has a length 440 that is substantially equal (e.g., within 10 percent) to the segment's 132 length 430.

As further illustrated in FIG. 1, some embodiments of the device further include a capacitor 150. The capacitor 150 includes a lower electrode layer that can include the III-V semiconductor substrate 127 (FIG. 3), a dielectric layer 155 located on the III-V semiconductor substrate 127 (FIG. 3), and an upper metal electrode layer 160 located on the dielectric layer 155 and adjacent to the controllable waveguides 120, 125. The capacitor 150 can be used as part of an on-chip bias T to provide a DC bias voltage to the modulator.

As illustrated in FIG. 3, in some embodiments, the dielectric layer 155 can also conformably cover the sidewalls 360 of the stack 305. For instance, in cases where the dielectric layer 155 is composed of an inorganic dielectric material, such as silicon oxide, a thermal or chemical vapor deposition process can facilitate a conformal covering of the side walls 360. Having the sidewalls 360 covered with the dielectric layer 155 can beneficially protect the stack 305 from damage during subsequent device fabrication steps and, in some cases when composed of an inorganic dielectric material (e.g., silicon oxide), can also prevent organic contamination of the stack 305 from materials present in certain embodiments of the insulator 148 (e.g., a benzocyclobutene insulator in some embodiments).

As also illustrated in FIG. 1, in some embodiments, the device further includes one or more bias electrode pads 165 located on the substrate 127. The device can be configured to apply a bias voltage via the pads 165 to the substrate 127. One skilled in the art would recognize that the device 100 could include other components, such as waveguides 170, 172 to deliver the carrier light to and from the interferometer 105, respectively.

Another embodiment of the disclosure is a method of modulating digital data onto an optical carrier. That is, electronically encoding a data stream of electronically encoded information) onto an optical carrier, e.g., an unmodulated optical carrier.

With continuing reference to FIGS. 1-4, FIG. 5 presents a flow diagram of an example method 500 of modulating digital data onto an optical carrier. The method 500 includes a step 510 of modulating an optical carrier (e.g., encoding a stream of optically encoded information into a light).

Modulating the optical carrier (step 510) includes a step 520 of intensity splitting the optical carrier in an input optical coupler 110 of an interferometer 105, e.g., of any of FIGS. 1-4. For instance, the splitting transmits mutually coherent portions of the received optical carrier to the controllable optical waveguides 120, 125 in parallel.

Modulating the optical carrier (step 510) includes a step 530 of optically modulating, in parallel, a separate data stream onto the individual mutually coherent optical carriers produced by the splitting. In some cases, the step 530 of optically modulating can involve modulating the separate mutually coherent optical carriers with substantially identical optical modulators. In some cases, the steps 530 of modulating can be driven by different digital data streams.

Modulating the optical carrier (step 510) can include a step 540 of interfering the modulated mutually coherent optical signals at the output coupler to produce to an amplitude-modulated and/or phase-modulated optical carrier, which carries a stream of optical signal points in a preselected constellation.

The step 530, can include a step 550 of applying electrical drive signals to the two-state modulators 130 controlling the separate mutually cohere optical carriers produced by the splitting step.

In some cases, the step 540 of interfering further includes a step 560 of interfering the separate modulated and mutually coherent optical carriers with fixed relative phase differences.

In some cases, e.g., the method 500 may include a step 570 of applying a relative static-phase adjustment (e.g., via static phase adjustor 135) to all but one of the controllable optical waveguides 120, 125.

In some embodiments of the method 500, the optically interfering step 530 produces modulated optical signal values in a quadrature amplitude modulation (QAM) optical constellation.

Figure 6A:
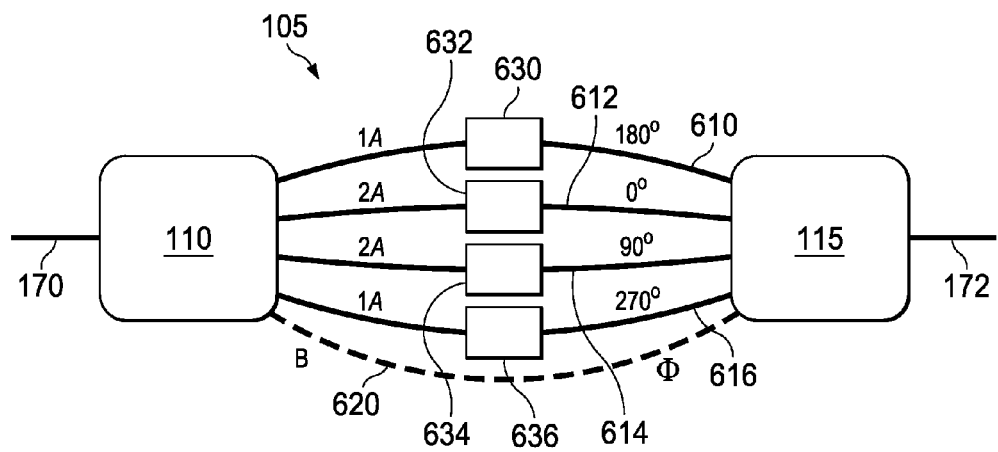
FIG. 6A shows an example interferometer having four controllable waveguides and a fifth static-controlled waveguide configured to apply a quadrature amplitude modulation optical format.
Figure 6B:
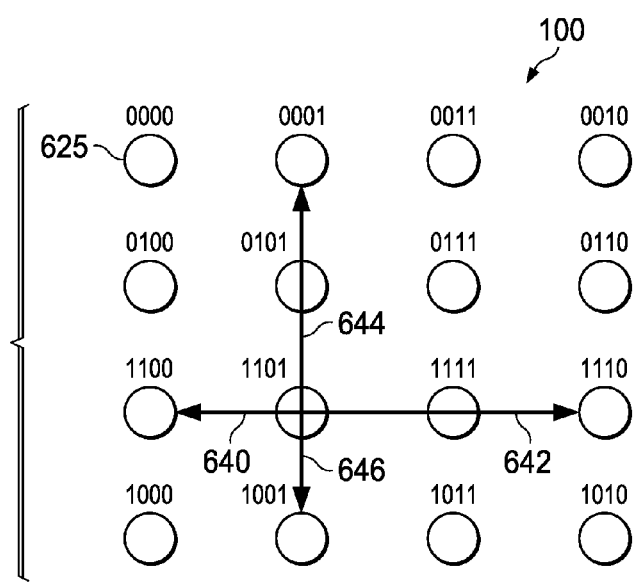
FIG. 6B shows an example two-dimensional square lattice of constellation points produced using an quadrature amplitude modulation optical format, for example, such as presented in FIG. 6A.

To further illustrate such embodiments, FIG. 6A shows an example interferometer 105 having four controllable waveguides 610, 612, 614, 616 and a fifth static-controlled waveguide 620. The four controllable optical waveguides 610, 612, 614, 616 are controlled with the two-state modulators 630, 632, 634, 636, e.g., configured as quantum-confined Stark-effect modulators. FIG. 6B shows an example two-dimensional square lattice of constellation points 625 produced using the QAM optical format. The four vectors 640, 642, 644, 646 show example phase and amplitude modulation according to amplitude and phase modulations applied using modulators 630, 632, 634, 636, respectively. The terms "1A," "2A," in FIG. 6A refer to example amplitudes (e.g., relative power splitting ratios) of light sent through the four controllable optical waveguides 610, 612, 614, 616, and, the angles presented in the figure refer to example static relative phase shifts applied to the optical carrier that pass through the controllable waveguides 610, 612, 614, 616 via modulators 630, 632, 634, 636, respectively. For the example configuration depicted, the second and third interior controllable optical waveguides 612, 614 are both connected to receive light and/or output couple light with an amplitude coupling coefficient 2A, while the exterior first and fourth waveguides 610, 616 are both connected to receive light and/or output light with an amplitude coupling coefficient 1A.

As an example, consider the case where the two states of each two-state modulator 130 have respective optical transmission coefficients of 1 and $\alpha \exp(j\theta)$. The former is the "on" state, and the latter is the "off" state. Here, $\alpha$ is the magnitude of the transmission coefficient in the second state. Therefore the modulator 130, in the second state, has an extinction ratio (er) $\alpha^{-2}$ and peak-to-peak phase shift $\theta$. A typical value of $\alpha$ is 0.5, and a typical value of $\theta$ is 50 degrees. The power splitting ratios of the couplers 110, 115 are multiples of A and the static relative phases of each of the optical waveguides are as depicted in FIG. 6B. Here, A is given by:

$$A_{qam} = \frac{\sqrt{2}}{6\sqrt{2} + |1 + \alpha e^{j\theta}|}.$$

The optional static-controlled waveguide 140 can have static power splitting of B, e.g., to minimize the DC optical carrier signal, B may be given by:

$$B_{qam}e^{j\phi} = \frac{(1+j)(1+\alpha e^{j\theta})}{2} A_{qam}.$$

For example, turning on the first 610 and third 614 controllable optical waveguides, with the above-described power splitting values and fixed relative phase shifts combinations of the figure, (e.g., 1A, 180° and 2A, 90°, respectively) would correspond to the 0000 constellation point 625 in FIG. 6B.

Figure 7A:
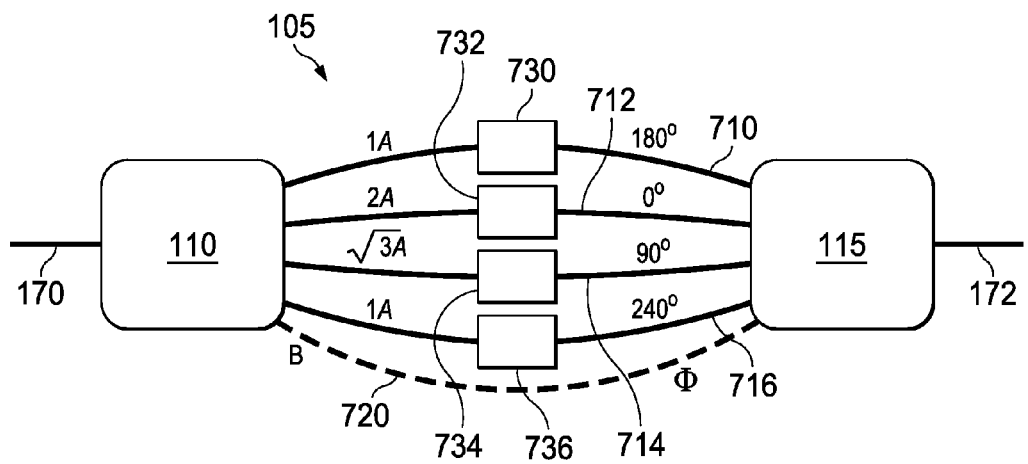
FIG. 7A shows an example interferometer having four controllable waveguides and a fifth static-controlled waveguide configured to apply a hexagonal modulation optical format.
Figure 7B:
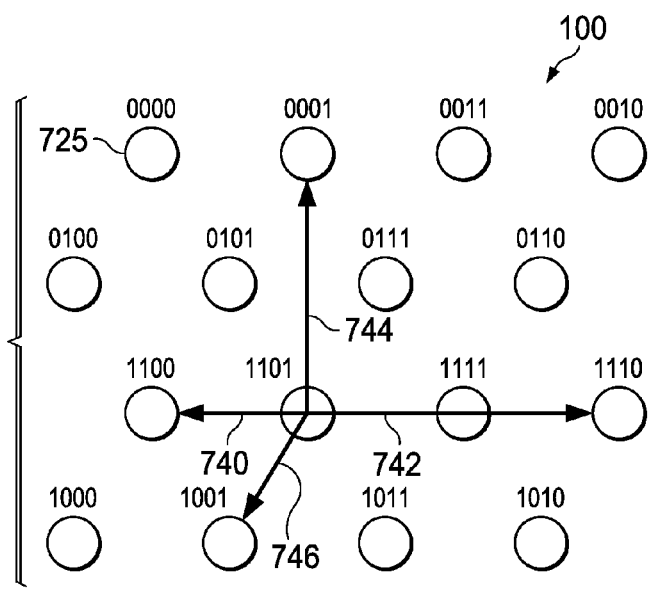
FIG. 7B shows an example two-dimensional square lattice of constellation points produced using an hexagonal modulation optical format, for example, such as presented in FIG. 7A.

In some embodiments of the method 500 produces optical signal points in a hexagonal (HEX) constellation (e.g., a triangular lattice format). Again, to further illustrate such embodiments, FIG. 7A shows an example interferometer 105 having four controllable waveguides 710, 712, 714, 716 and a fifth static-controlled waveguide 720. The four controllable optical waveguides 710, 712, 714, 716 are controlled with the two-state modulators 130 configured as a quantum-confined Stark-effect modulators. FIG. 7B shows an example two-dimensional square lattice of constellation points 725 produced using the QAM optical format. The four vectors 740, 742, 744, 746 show example phase and amplitude modulation according to amplitude and phase modulations applied using modulators 730, 732, 734, 736, respectively. The terms 1A, √3A, 2A, in FIG. 7A refer to example relative amplitudes (power splitting ratios) of light sent through the four controllable optical waveguides 710, 712, 714, 716 and the angles presented in the figure refer to example phase modulations applied to the optical carrier passing through the controllable waveguides 710, 712, 714, 716 modulators 730, 732, 734, 736, respectively For the example configuration depicted, the second and third interior controllable optical waveguides 712, 714 are both configured to receive light and/or output light with amplitude coupling coefficients of 2A and √3 A, respectively, while the exterior first and fourth waveguides 710, 716 are both configured to receive and/or output light with amplitude coupling coefficients of 1A.

As an example, the power splitting ratios of the couplers and the phases of the arms are given in FIG. 7B, where A is given by:

$$A_{qam} = \frac{\sqrt{2}}{6\sqrt{2} + |1 + \alpha e^{j\theta}|}.$$

The optional static-controlled waveguide 140 can have static power splitting of B, e.g., to minimize the power in a DC carrier signal, where B is given by:

$$B_{qam}e^{j\phi} = \frac{(1+j)(1+\alpha e^{j\theta})}{2} A_{qam},$$

where $\phi$ is a static phase shift.

One skilled in the art would appreciate that the particular configurations of relative light amplitudes and phase shifts presented in FIGS. 6A and 7A and the respective data constellations produced are only examples, and that, the controllable and static waveguides could be configured in different ways, and using different numbers of waveguides, in accordance with the present invention, to apply different amplitudes and phase shifts to produce square-QAM, HEX-QAM, or other optical modulation formats.

Although the embodiments have been described in detail, those of ordinary skill in the art should understand that they could make various changes, substitutions and alterations herein without departing from the scope of the disclosure.

What is claimed is:

1. An optical modulation device, comprising:
    an interferometer including an input optical coupler, an output optical coupler, and two or more controllable optical waveguides located on a substrate, each controllable optical waveguide connecting the input optical coupler to the output optical coupler and having a two-state modulator along a segment thereof; and
    wherein the two or more controllable optical waveguides are connected to transmit an output to the output optical coupler, substantially different light amplitudes and/or phases when the two-state modulators of the two or more controllable optical waveguides are in different states, as driven by data streams having different information content, and
    the two or more controllable optical waveguides are configured to modulate the light amplitudes and/or phases in a substantially same manner when the two-state modulators are in identical states.

2. The device of claim 1, wherein the two-state modulator includes a Mach-Zender interferometer modulator.

3. The device of claim 1, wherein each of the controllable waveguides each includes a stack of III-V semiconductor material layers located on the substrate which includes a III-V substrate.

4. An optical modulation device, comprising:
    an interferometer including an input optical coupler, an output optical coupler, and two or more controllable optical waveguides located on a substrate, each controllable optical waveguide connecting the input optical coupler to the output optical coupler and having a two-state modulator along a segment thereof; and
    wherein the two or more controllable optical waveguides are connected to transmit an output to the output optical coupler, substantially different light amplitudes and/or phases when the two-state modulators of the two or more controllable optical waveguides are in different states, as driven by data streams having different information content, and
    the two or more controllable optical waveguides are configured to modulate the light amplitudes and/or phases in a substantially same manner when the two-state modulators are in identical states, wherein all but one of the controllable optical waveguides further includes a static-phase adjustor.

5. An optical modulation device, comprising:
    an interferometer including an input optical coupler, an output optical coupler, and two or more controllable optical waveguides located on a substrate each controllable optical waveguide connecting the input optical coupler to the output optical coupler and having a two-state modulator along a segment thereof; and
    wherein the two or more controllable optical waveguides are connected to transmit an output to the output optical coupler, substantially different light amplitudes and/or phases when the two-state modulators of the two or more controllable optical waveguides are in different states, as driven by data streams having different information content, and
    the two or more controllable optical waveguides are configured to modulate the light amplitudes and/or phases in a substantially same manner when the two-state modulators are in identical states, wherein one or both of the input optical coupler or output optical coupler are further configured to provide a static phase adjustment to all but one of the controllable optical waveguides.

6. An optical modulation device, comprising:

an interferometer including an input optical coupler, an output optical coupler, and two or more controllable optical waveguides located on a substrate, each controllable optical waveguide connecting the input optical coupler to the output optical coupler and having a two-state modulator along a segment thereof; and wherein the two or more controllable optical waveguides are connected to transmit an output to the output optical coupler, substantially different light amplitudes and/or phases when the two-state modulators of the two or more controllable optical waveguides are in different states, as driven by data streams having different information content, and the two or more controllable optical waveguides are configured to modulate the light amplitudes and/or phases in a substantially same manner when the two-state modulators are in identical states, wherein the interferometer further includes a static-controlled waveguide.

7. The device of claim 6, wherein the interferometer further includes one or more optical phase and amplitude attenuators coupled to the static-controlled waveguide.

8. The device of claim 6, wherein the static-controlled waveguide connects the input optical coupler to the output optical coupler.

9. An optical modulation device, comprising:

an interferometer including an input optical coupler, an output optical coupler, and two or more controllable optical waveguides located on a substrate, each controllable optical waveguide connecting the input optical coupler to the output optical coupler and having a two-state modulator along a segment thereof; and wherein the two or more controllable optical waveguides are connected to transmit an output to the output optical coupler, substantially different light amplitudes and/or phases when the two-state modulators of the two or more controllable optical waveguides are in different states, as driven by data streams having different information content, and the two or more controllable optical waveguides are configured to modulate the light amplitudes and/or phases in a substantially same manner when the two-state modulators are in identical states, wherein the two-state modulator includes a quantum-confined Stark-effect modulator.

10. An optical modulation device, comprising:

an interferometer including an input optical coupler, an output optical coupler, and two or more controllable optical waveguides located on a substrate, each controllable optical waveguide connecting the input optical coupler to the output optical coupler and having a two-state modulator along a segment thereof; and wherein the two or more controllable optical waveguides are connected to transmit an output to the output optical coupler, substantially different light amplitudes and/or phases when the two-state modulators of the two or more controllable optical waveguides are in different states, as driven by data streams having different information content, and the two or more controllable optical waveguides are configured to modulate the light amplitudes and/or phases in a substantially same manner when the two-state modulators are in identical states, wherein each of the controllable waveguides each includes a stack of III-V semiconductor material layers located on the substrate which includes a III-V substrate and the stack includes a quantum well layer, a band-gap III-V transition layer on the quantum well layer and an intrinsic III-V material layer on the band-gap III-V transition layer, wherein the band-gap III-V transition layer has a band gap that is intermediate between the band gap of barrier layers of the quantum well layer and the band gap of the intrinsic III-V material layer.

11. The device of claim 10, wherein the composition of the band-gap III-V transition layer is adjusted in two or more stages such that, in a direction towards the intrinsic III-V material layer, the transition layer's band gap changes from a value substantial equal to the band gap of the barrier layer of the quantum well, to a value substantially equal to the band gap of the intrinsic III-V material layer.

12. The device of claim 10, wherein the stack further includes a p-doped III-V material layer on the intrinsic III-V material layer and a p+doped III-V material layer on the p-doped III-V material layer, and a height of a p-doped III-V material layer in the stack of passive segments of the controllable waveguides are in range of about 15 to 25 percent less than a height of the p-doped III-V material layer in a modulated segment of the controllable waveguides.

13. The device of claim 10, further including a capacitor, wherein the capacitor includes:

a lower electrode layer that includes the III-V semiconductor substrate, a dielectric layer located on the III-V semiconductor substrate, and an upper electrode layer located on the dielectric layer and adjacent to the controllable waveguides.

* * * * *